US008821264B2

(12) United States Patent
Arnone et al.

(10) Patent No.: US 8,821,264 B2
(45) **Date of Patent: *Sep. 2, 2014**

(54) CONTROLLED ENTITY HYBRID GAME

(71) Applicant: Gamblit Gaming, LLC, Glendale, CA (US)

(72) Inventors: Miles Arnone, Sherborn, MA (US); Eric Meyerhofer, Pasadena, CA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,384

(22) Filed: Sep. 5, 2013

(65) Prior Publication Data

US 2014/0080580 A1 Mar. 20, 2014

Related U.S. Application Data

(63) Continuation of application No. PCT/US2012/068739, filed on Dec. 10, 2012.

(60) Provisional application No. 61/630,371, filed on Dec. 9, 2011.

(51) Int. Cl.

| | |
|---|---|
| ***A63F 13/00*** | (2014.01) |
| ***G06F 17/00*** | (2006.01) |
| ***G07F 17/32*** | (2006.01) |

(52) U.S. Cl.

CPC ............ *G07F 17/3244* (2013.01); *G07F 17/32* (2013.01); *G07F 17/326* (2013.01)

USPC .............................................. 463/25; 463/16

(58) Field of Classification Search

USPC .......................................... 463/16, 20, 25, 42

See application file for complete search history.

(56) References Cited

U.S. PATENT DOCUMENTS

| | | | |
|---|---|---|---|
| 5,413,357 | A | 5/1995 | Schulze et al. |
| 5,718,429 | A | 2/1998 | Keller |

(Continued)

FOREIGN PATENT DOCUMENTS

| | | | |
|---|---|---|---|
| JP | 2001300098 | A | 10/2001 |
| JP | 2003111980 | A | 4/2003 |

(Continued)

OTHER PUBLICATIONS

ITL.NIST.GOV, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.

(Continued)

*Primary Examiner* — William Brewster
*Assistant Examiner* — Jason Skaarup
(74) *Attorney, Agent, or Firm* — Frank Cire

(57) ABSTRACT

Systems and methods in accordance with embodiments of the invention operate a controlled entity hybrid game. The controlled entity hybrid game, includes a real world engine constructed to provide a randomly generated payout of real world credits from at least one wager in a gambling game, an entertainment software engine constructed to execute an entertainment game providing outcomes based upon a player's skillful execution of the entertainment game, and a game world engine constructed to manage the entertainment software engine and communicate, to the gambling game, a gameplay gambling event occurrence based upon a player's instruction of a controlled entity to consume an enabling element of the entertainment game that triggers a wager in the gambling game.

12 Claims, 12 Drawing Sheets

(56) References Cited

U.S. PATENT DOCUMENTS

| | | | | |
|---|---|---|---|---|
| 5,785,592 | A | 7/1998 | Jacobsen | |
| 5,853,324 | A | 12/1998 | Kami et al. | |
| 5,963,745 | A | 10/1999 | Collins et al. | |
| 6,050,895 | A | 4/2000 | Luciano | |
| 6,227,974 | B1 | 5/2001 | Eilat | |
| 6,267,669 | B1 | 7/2001 | Luciano | |
| 6,712,693 | B1 | 3/2004 | Hettinger | |
| 6,761,632 | B2 | 7/2004 | Bansemer et al. | |
| 6,761,633 | B2 | 7/2004 | Riendeau | |
| 6,764,397 | B1 | 7/2004 | Robb | |
| 6,811,482 | B2 | 11/2004 | Letovsky | |
| 7,118,105 | B2 | 10/2006 | Benevento | |
| 7,294,058 | B1 | 11/2007 | Slomiany | |
| 7,326,115 | B2 | 2/2008 | Baerlocher | |
| 7,361,091 | B2 | 4/2008 | Letovsky | |
| 7,517,282 | B1 | 4/2009 | Pryor | |
| 7,575,517 | B2 | 8/2009 | Parham et al. | |
| 7,682,239 | B2 | 3/2010 | Friedman et al. | |
| 7,720,733 | B2 | 5/2010 | Jung | |
| 7,753,770 | B2 | 7/2010 | Walker et al. | |
| 7,753,790 | B2 | 7/2010 | Nguyen | |
| 7,766,742 | B2 | 8/2010 | Bennett et al. | |
| 7,775,885 | B2 | 8/2010 | Van Luchene | |
| 7,798,896 | B2 | 9/2010 | Katz | |
| 7,828,657 | B2 | 11/2010 | Booth | |
| 7,917,371 | B2 | 3/2011 | Jung et al. | |
| 7,938,727 | B1 | 5/2011 | Konkle | |
| 7,967,674 | B2 | 6/2011 | Baerlocher | |
| 7,980,948 | B2 | 7/2011 | Rowe | |
| 7,996,264 | B2 | 8/2011 | Kusumoto et al. | |
| 8,012,023 | B2 | 9/2011 | Gates | |
| 8,047,915 | B2 | 11/2011 | Lyle | |
| 8,060,829 | B2 | 11/2011 | Jung et al. | |
| 8,075,383 | B2 | 12/2011 | Friedman et al. | |
| 8,087,999 | B2 | 1/2012 | Oberberger | |
| 8,113,938 | B2 | 2/2012 | Friedman et al. | |
| 8,118,654 | B1 | 2/2012 | Nicolas | |
| 8,128,487 | B2 | 3/2012 | Hamilton et al. | |
| 8,135,648 | B2 | 3/2012 | Oram | |
| 8,137,193 | B1 | 3/2012 | Kelly et al. | |
| 8,157,653 | B2 | 4/2012 | Buhr | |
| 8,167,699 | B2 | 5/2012 | Inamura | |
| 8,177,628 | B2 | 5/2012 | Manning | |
| 8,182,338 | B2 | 5/2012 | Thomas | |
| 8,182,339 | B2 | 5/2012 | Anderson | |
| 8,187,068 | B2 | 5/2012 | Slomiany | |
| 8,206,210 | B2 | 6/2012 | Walker | |
| 8,475,266 | B2 * | 7/2013 | Arnone et al. | 463/25 |
| 2001/0004609 | A1 | 6/2001 | Walker et al. | |
| 2001/0019965 | A1 | 9/2001 | Ochi | |
| 2002/0022509 | A1 | 2/2002 | Nicastro | |
| 2002/0090990 | A1 | 7/2002 | Joshi et al. | |
| 2002/0175471 | A1 | 11/2002 | Faith | |
| 2003/0060286 | A1 | 3/2003 | Walker et al. | |
| 2003/0119576 | A1 | 6/2003 | McClintic et al. | |
| 2003/0139214 | A1 | 7/2003 | Wolf et al. | |
| 2003/0171149 | A1 | 9/2003 | Rothschild | |
| 2003/0204565 | A1 | 10/2003 | Guo et al. | |
| 2003/0211879 | A1 | 11/2003 | Englman | |
| 2004/0092313 | A1 | 5/2004 | Saito et al. | |
| 2004/0102238 | A1 | 5/2004 | Taylor | |
| 2004/0121839 | A1 | 6/2004 | Webb | |
| 2004/0225387 | A1 | 11/2004 | Smith | |
| 2005/0003878 | A1 | 1/2005 | Updike | |
| 2005/0096124 | A1 | 5/2005 | Stronach | |
| 2005/0116411 | A1 | 6/2005 | Herrmann et al. | |
| 2005/0192087 | A1 | 9/2005 | Friedman et al. | |
| 2005/0233791 | A1 | 10/2005 | Kane | |
| 2005/0233806 | A1 | 10/2005 | Kane et al. | |
| 2005/0239538 | A1 | 10/2005 | Dixon | |
| 2005/0269778 | A1 | 12/2005 | Samberg | |
| 2005/0288101 | A1 | 12/2005 | Lockton et al. | |
| 2006/0003823 | A1 | 1/2006 | Zhang | |
| 2006/0003830 | A1 | 1/2006 | Walker et al. | |
| 2006/0040735 | A1 | 2/2006 | Baerlocher | |
| 2006/0068913 | A1 | 3/2006 | Walker et al. | |
| 2006/0084499 | A1 | 4/2006 | Moshal | |
| 2006/0084505 | A1 | 4/2006 | Yoseloff | |
| 2006/0135250 | A1 | 6/2006 | Rossides | |
| 2006/0154710 | A1 | 7/2006 | Serafat | |
| 2006/0166729 | A1 | 7/2006 | Saffari et al. | |
| 2006/0189371 | A1 | 8/2006 | Walker et al. | |
| 2006/0234791 | A1 | 10/2006 | Nguyen et al. | |
| 2006/0258433 | A1 | 11/2006 | Finocchio et al. | |
| 2007/0035548 | A1 | 2/2007 | Jung et al. | |
| 2007/0038559 | A1 | 2/2007 | Jung et al. | |
| 2007/0064074 | A1 | 3/2007 | Silverbrook et al. | |
| 2007/0087799 | A1 | 4/2007 | Van Luchene | |
| 2007/0093299 | A1 | 4/2007 | Bergeron | |
| 2007/0099696 | A1 | 5/2007 | Nguyen et al. | |
| 2007/0117641 | A1 | 5/2007 | Walker et al. | |
| 2007/0129149 | A1 | 6/2007 | Walker | |
| 2007/0156509 | A1 | 7/2007 | Jung et al. | |
| 2007/0167212 | A1 | 7/2007 | Nguyen | |
| 2007/0167239 | A1 | 7/2007 | O'Rourke | |
| 2007/0191104 | A1 | 8/2007 | Van Luchene | |
| 2007/0203828 | A1 | 8/2007 | Jung et al. | |
| 2007/0293306 | A1 | 12/2007 | Nee et al. | |
| 2008/0004107 | A1 | 1/2008 | Nguyen et al. | |
| 2008/0014835 | A1 | 1/2008 | Weston et al. | |
| 2008/0015004 | A1 | 1/2008 | Gatto et al. | |
| 2008/0064488 | A1 | 3/2008 | Oh | |
| 2008/0070659 | A1 | 3/2008 | Naicker | |
| 2008/0070690 | A1 | 3/2008 | Van Luchene | |
| 2008/0070702 | A1 | 3/2008 | Kaminkow | |
| 2008/0096665 | A1 | 4/2008 | Cohen | |
| 2008/0108406 | A1 * | 5/2008 | Oberberger | 463/16 |
| 2008/0108425 | A1 | 5/2008 | Oberberger | |
| 2008/0119283 | A1 | 5/2008 | Baerlocher | |
| 2008/0146308 | A1 | 6/2008 | Okada | |
| 2008/0176619 | A1 | 7/2008 | Kelly | |
| 2008/0191418 | A1 | 8/2008 | Lutnick et al. | |
| 2008/0195481 | A1 | 8/2008 | Lutnick | |
| 2008/0248850 | A1 | 10/2008 | Schugar | |
| 2008/0254893 | A1 | 10/2008 | Patel | |
| 2008/0274798 | A1 | 11/2008 | Walker et al. | |
| 2008/0311980 | A1 | 12/2008 | Cannon | |
| 2008/0318668 | A1 | 12/2008 | Ching | |
| 2009/0011827 | A1 | 1/2009 | Englman | |
| 2009/0023489 | A1 | 1/2009 | Toneguzzo | |
| 2009/0023492 | A1 | 1/2009 | Erfanian | |
| 2009/0061974 | A1 | 3/2009 | Lutnick et al. | |
| 2009/0061975 | A1 | 3/2009 | Ditchev | |
| 2009/0061991 | A1 * | 3/2009 | Popovich et al. | 463/25 |
| 2009/0061997 | A1 * | 3/2009 | Popovich et al. | 463/26 |
| 2009/0061998 | A1 * | 3/2009 | Popovich et al. | 463/26 |
| 2009/0061999 | A1 * | 3/2009 | Popovich et al. | 463/26 |
| 2009/0082093 | A1 | 3/2009 | Okada | |
| 2009/0098934 | A1 | 4/2009 | Amour | |
| 2009/0118006 | A1 | 5/2009 | Kelly et al. | |
| 2009/0124344 | A1 | 5/2009 | Mitchell et al. | |
| 2009/0131158 | A1 | 5/2009 | Brunet De Courssou et al. | |
| 2009/0131175 | A1 | 5/2009 | Kelly et al. | |
| 2009/0143141 | A1 | 6/2009 | Wells | |
| 2009/0149233 | A1 | 6/2009 | Strause et al. | |
| 2009/0156297 | A1 | 6/2009 | Andersson et al. | |
| 2009/0176560 | A1 | 7/2009 | Herrmann et al. | |
| 2009/0176566 | A1 | 7/2009 | Kelly | |
| 2009/0221355 | A1 | 9/2009 | Dunaevsky et al. | |
| 2009/0247272 | A1 | 10/2009 | Abe | |
| 2009/0291755 | A1 | 11/2009 | Walker et al. | |
| 2009/0309305 | A1 | 12/2009 | May | |
| 2009/0312093 | A1 | 12/2009 | Walker et al. | |
| 2009/0325686 | A1 | 12/2009 | Davis | |
| 2010/0004058 | A1 | 1/2010 | Acres | |
| 2010/0016056 | A1 | 1/2010 | Thomas et al. | |
| 2010/0035674 | A1 | 2/2010 | Slomiany | |
| 2010/0056247 | A1 | 3/2010 | Nicely | |
| 2010/0062836 | A1 | 3/2010 | Young | |
| 2010/0093420 | A1 | 4/2010 | Wright | |
| 2010/0120525 | A1 | 5/2010 | Baerlocher et al. | |
| 2010/0124983 | A1 | 5/2010 | Gowin et al. | |
| 2010/0137047 | A1 | 6/2010 | Englman et al. | |
| 2010/0174593 | A1 | 7/2010 | Cao | |

(56) References Cited

U.S. PATENT DOCUMENTS

| | | | | |
|---|---|---|---|---|
| 2010/0184509 | A1 | 7/2010 | Sylla et al. | |
| 2010/0203940 | A1 | 8/2010 | Alderucci et al. | |
| 2010/0210344 | A1 | 8/2010 | Edidin et al. | |
| 2010/0227672 | A1 | 9/2010 | Amour | |
| 2010/0227688 | A1 | 9/2010 | Lee | |
| 2010/0240436 | A1 | 9/2010 | Wilson et al. | |
| 2010/0304839 | A1 | 12/2010 | Johnson | |
| 2010/0304842 | A1 | 12/2010 | Friedman et al. | |
| 2011/0009177 | A1 | 1/2011 | Katz | |
| 2011/0009178 | A1 | 1/2011 | Gergon | |
| 2011/0045896 | A1 | 2/2011 | Sak et al. | |
| 2011/0077087 | A1 | 3/2011 | Walker et al. | |
| 2011/0082571 | A1 | 4/2011 | Murdock et al. | |
| 2011/0109454 | A1 | 5/2011 | McSheffrey | |
| 2011/0111820 | A1 * | 5/2011 | Filipour et al. | 463/16 |
| 2011/0111837 | A1 | 5/2011 | Gagner | |
| 2011/0118011 | A1 | 5/2011 | Filipour et al. | |
| 2011/0201413 | A1 | 8/2011 | Oberger | |
| 2011/0207523 | A1 | 8/2011 | Filipour et al. | |
| 2011/0212766 | A1 | 9/2011 | Bowers | |
| 2011/0212767 | A1 | 9/2011 | Barclay | |
| 2011/0218028 | A1 | 9/2011 | Acres | |
| 2011/0218035 | A1 | 9/2011 | Thomas | |
| 2011/0230258 | A1 | 9/2011 | Van Luchene | |
| 2011/0230260 | A1 | 9/2011 | Morrow et al. | |
| 2011/0244944 | A1 | 10/2011 | Baerlocher | |
| 2011/0263312 | A1 | 10/2011 | De Waal | |
| 2011/0269522 | A1 | 11/2011 | Nicely et al. | |
| 2011/0275440 | A1 | 11/2011 | Faktor | |
| 2011/0287828 | A1 | 11/2011 | Anderson et al. | |
| 2011/0287841 | A1 | 11/2011 | Watanabe | |
| 2011/0312408 | A1 | 12/2011 | Okuaki | |
| 2012/0058814 | A1 | 3/2012 | Lutnick | |
| 2012/0077569 | A1 | 3/2012 | Watkins | |
| 2012/0108323 | A1 | 5/2012 | Kelly | |
| 2012/0202587 | A1 | 8/2012 | Allen | |
| 2012/0302311 | A1 | 11/2012 | Luciano | |
| 2012/0322545 | A1 | 12/2012 | Arnone et al. | |
| 2013/0131848 | A1 | 5/2013 | Arnone et al. | |
| 2013/0190074 | A1 | 7/2013 | Arnone et al. | |

FOREIGN PATENT DOCUMENTS

| | | | |
|---|---|---|---|
| JP | 2004097610 | A | 4/2004 |
| JP | 2004166746 | A | 6/2004 |
| WO | 9851384 | A1 | 11/1998 |
| WO | 2010087090 | A1 | 8/2010 |
| WO | WO 2011109454 | A1 * | 9/2011 |
| WO | 2012139083 | A1 | 10/2012 |

OTHER PUBLICATIONS

Changing the Virtual Self: Avatar Transformations in Popular Games; Barr et al., Victoria Univ., NZ, 2006.

Real-Time Multimodal Human—Avatar Interaction; Li et al., IEEE (Video Technology) vol. 18, No. 4, 2008.

* cited by examiner

CONTROLLED ENTITY HYBRID GAME

CROSS REFERENCE TO RELATED APPLICATIONS

This application is a continuation of Patent Cooperation Treaty Application No. PCT/US12/68739, filed on Dec. 10, 2012, which claims the benefit of U.S. Provisional Patent Application No. 61/630,371, filed on Dec. 9, 2011 and is related to Patent Cooperation Treaty Application No. PCT/US11/26768, filed Mar. 1, 2011, Patent Cooperation Treaty Application No. PCT/US11/63587, filed on Dec. 6, 2011, and Patent Cooperation Treaty Application No. PCT/US12/58156, filed on Sep. 29, 2012, the contents of each of which are hereby incorporated by reference in its entirety as if stated in full herein.

FIELD OF THE INVENTION

Embodiments of the present invention are generally related to gaming and more specifically to various control elements within a hybrid game that includes both an entertainment game and a gambling game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

SUMMARY

Systems and methods in accordance with embodiments of the invention operate a controlled entity hybrid game. In one embodiment, the controlled entity hybrid game includes a real world engine constructed to provide a randomly generated payout of real world credits from at least one wager in a gambling game, an entertainment software engine constructed to execute an entertainment game providing outcomes based upon a player's skillful execution of the entertainment game, and a game world engine constructed to manage the entertainment software engine and communicate, to the gambling game, a gameplay gambling event occurrence based upon a player's instruction of a controlled entity to consume an enabling element of the entertainment game that triggers a wager in the gambling game.

In another embodiment, the element is changed on the basis of the randomly generated payout.

In a further embodiment, an amount of the element is changed.

In another embodiment, an attribute of the element is changed.

In a further embodiment, consumption of the element by the controlled entity causes an actionable element to trigger the wager.

In another embodiment, the element is not consumed unless entertainment game state requirements are met.

In a further embodiment, the element is changed on the basis of the randomly generated payout and on the basis of a change in a game world credit caused by entertainment game play.

In another embodiment, a method of operating a controlled entity hybrid game is provided. The method includes providing gambling game having a randomly generated payout of real world credits from at least one wager; providing an entertainment game that determines outcomes based upon a player's skillful execution of the entertainment game; and communicating, to the gambling game, a gameplay gambling event occurrence based upon a player's instruction of a controlled entity to consume an enabling element of the entertainment game that triggers a wager in the gambling game.

In yet another embodiment, a machine readable medium containing processor instructions is provided. The instructions, when executed by a processor, causes the processor to perform a process including providing a gambling game having a randomly generated payout of real world credits from at least one wager, providing an entertainment game that determines outcomes based upon a player's skillful execution of the entertainment game, and communicating, to the gambling game, a gameplay gambling event occurrence based upon a player's instruction of a controlled entity to consume an enabling element of the entertainment game that triggers a wager in the gambling game.

DETAILED DESCRIPTION

Figure 1:
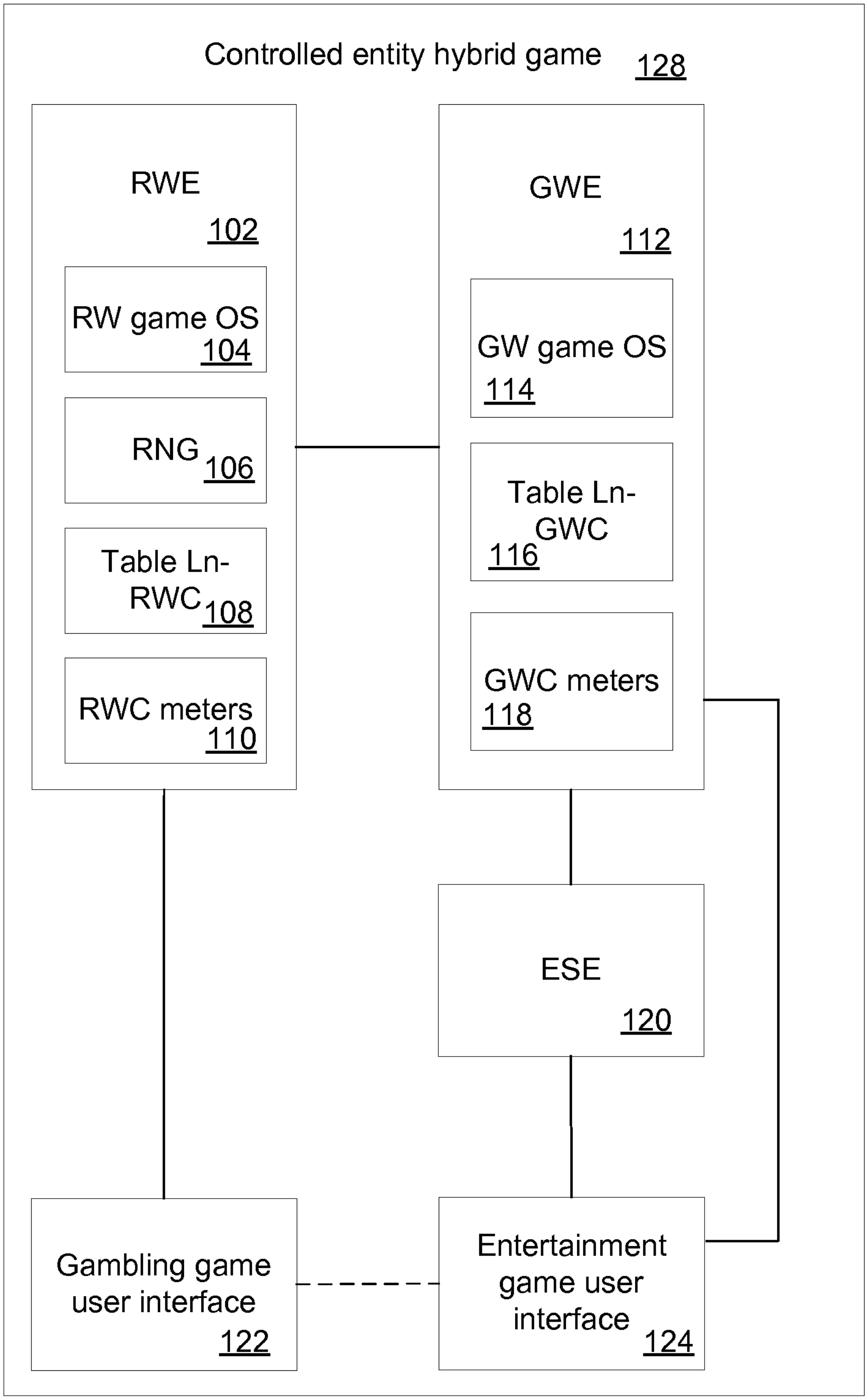
FIG. 1 illustrates a controlled entity hybrid game in accordance with an embodiment of the invention.

Turning now to the drawings, systems and methods for operation of a controlled entity hybrid game are illustrated. In several embodiments, a controlled entity hybrid game is a form of a hybrid game that incorporates a controlled entity within an entertainment game portion of a hybrid game. The controlled entity is acted upon by a player and acts upon various classes of elements within the entertainment portion of a hybrid game. When acted upon, these various elements trigger bets or wagers in a gambling game portion of the hybrid game. In certain embodiments, the controlled entity hybrid game also includes a user interface associated with either or both the gambling game and the entertainment game. In operation of a controlled entity hybrid game, a player acts upon a controlled entity which in turn utilizes various types of elements of the entertainment game in a game world environment. Upon utilization of some of these elements, a wager is triggered in the gambling game. In playing the entertainment game, using the controlled entity, a player can consume and accrue game world credits (GWC) within the entertainment game. These credits can be in the form of (but are not limited to) game world objects, experience points, or points generally. Wagers are made in the gambling game using real world credits (RWC). The real world credits can be credits in an actual currency, or may be credits in a virtual currency which has real world value. Gambling outcomes from the gambling game may cause consumption, loss or accrual of RWC. In addition, gambling outcomes in the gambling game may influence elements in the entertainment game such as (but not limited to) by adding an element, restoring a consumed element, causing the loss of an element, restoration of an element, or placement of an element. Example elements include (but are not limited to) enabling elements (EE) which are elements that enable a player's play of the entertainment game and whose consumption by the controlled entity while playing the entertainment game may trigger a wager in the gambling game. In addition, EE may also be replenished during play within the entertainment game based on an outcome of a triggered wager. Other types of elements include actionable elements (AE), which are elements that are acted upon to trigger a wager in the gambling game and may not be restorable during normal play of the entertainment game, and collective enabling elements (CEE). Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety.

In many embodiments, a controlled entity hybrid game is a hybrid game incorporating controlled entities that are controlled by a player and act upon various types of elements in a hybrid game. A controlled entity hybrid game can be used to generate a rich gameplay experience. As is discussed further below, any of a variety of different controlled entity hybrid game scenarios can be utilized including (but not limited to) war themed controlled entity hybrid games, sports themed controlled entity hybrid games, and racing themed controlled entity hybrid games.

Controlled Entity Hybrid Games

In many embodiments, a controlled entity hybrid game integrates high levels of entertainment content with a game of skill (entertainment game), a gambling experience with a game of chance (gambling game). A controlled entity hybrid game provides for random outcomes independent of player skill while providing that the user's gaming experience (as measured by obstacles/challenges encountered, time of play and other factors) is shaped by the player's skill. A controlled entity hybrid game in accordance with an embodiment of the invention is illustrated in FIG. 1. The controlled entity hybrid game 128 includes a RWE 102, GWE 112, ESE 120, gambling game user interface 122 and entertainment game user interface 124. The two user interfaces may be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In several embodiments, the RWE 102 is the operating system for the gambling game of the skill calibrated hybrid game 128 and controls and operates the gambling game. The operation of a gambling game is enabled by RWC, such as money, real world funds, or a virtual currency. A gambling game can increase or decreases an amount of RWC based on random gambling outcomes, where the gambling proposition of a gambling game is typically regulated by gaming control bodies. In many embodiments, the RWE includes a RW operating system (OS) 104, random number generator (RNG) 106, level "n" real-world credit pay tables (Table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level "n" real-world credit pay table (Table Ln-RWC) 108 is a table that can be used in conjunction with a random number generator (RNG) 106 to dictate the real world credits (RWC) earned as a function of sponsored gameplay and is analogous to the pay tables used in a conventional slot machine. Table Ln-RWC payouts are independent of player skill. There may be one or a plurality of Table Ln-RWC pay tables 108 contained in a gambling game, the selection of which may be determined by factors including (but not limited to) game progress a player has earned, and/or bonus rounds which a player may be eligible for. Real world credits (RWC) are credits analogous to slot machine game credits, which are entered into a gambling game by the user, either in the form of money such as hard currency or electronic funds. RWCs can be decremented or augmented based on the outcome of a random number generator according to the Table Ln-RWC real world credits pay table 108, independent of player skill. In certain embodiments, an amount of RWC can be required to enter higher ESE game levels. RWC can be carried forward to higher game levels or paid out if a cash out is opted for by a player. The amount of RWC required to enter a specific level of the game "level n" need not be the same for each level.

In many embodiments, the GWE 112 manages the overall controlled entity hybrid game operation, with the RWE 102 and the ESE 120 effectively being support units to the GWE 112. In several embodiments, the GWE 112 contains mechanical, electronic and software system for an entertainment game. The GWE 112 includes a GW game operating system (OS) 114 that provides control of the entertainment game. The GWE additionally contains a level "n" game world credit pay table (Table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120. The GWE can also utilize a multilayer module to apply a gameplay impact generated from a player action in one gameplay layer to players at different gameplay layers. In numerous embodiments, a GWE can utilize a multilayer module to detect at least one player action, analyze the at least one player action for a gameplay impact and apply the gameplay impact to the gameplay of players at different gameplay layers in the controlled entity hybrid game in accordance with the gameplay impact. The players at different gameplay layers can be part of a player class at the different gameplay layers.

In many embodiments, a level "n" game world credit pay table (Table Ln-GWC) 116 dictates the GWC earned as a function of player skill in the nth level of the game. The payouts governed by this table are dependent upon player skill and sponsored gameplay at large and may or may not be coupled to a random number generator. In several embodiments, game world credits (GWC) are player points earned or depleted as a function of player skill, i.e. as a function of player performance in the context of the game. GWC is analogous to the "score" in a typical video game. Each entertainment game has one or more scoring criterion, embedded within the Table Ln-GWC 116 that reflects player performance against the goal(s) of the game. GWC can be carried forward from one level of sponsored gameplay to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In certain embodiments, the operation of the GWE does not affect the RWE's gambling operation except for player choice parameters that are allowable in slot machines today including but not limited to the wager amount, how fast the player wants to play (by pressing a button or pulling the slot's handle) and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a necessary status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the player's user interface directly, as this may be necessary to communicate certain entertainment game club points, player status, control the selection of choices and messages which a player may find useful in order to adjust their entertainment game experience or understand their gambling status in the RWE 102.

In various embodiments, the ESE 120 manages and controls the visual, audio, and player control for the entertainment game. In certain embodiments, the ESE 120 accepts input from a player through a set of hand controls, and/or head, gesture, and/or eye tracking systems and outputs video, audio and/or other sensory output to a user interface. In many embodiments, the ESE 120 can exchange data with and accept control information from the GWE 112. In several embodiments an ESE 120 can be implemented using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In numerous embodiments, an ESE can be an electromechanical game system of a controlled entity hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

In many embodiments, the ESE 120 operates mostly independently from the GWE 112, except that via the interface, the GWE 112 may send certain GW game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements may be based on a gambling outcome of a gambling game that was triggered by an element in the entertainment game being acted upon by the player. The ESE 120 can accept this input from the GWE 112, make adjustments, and continue the play action all the while running seamlessly from the player's perspective. The ESE's operation is mostly skill based, except for where the ESE's processes may inject complexities into the game by chance in its normal operation to create unpredictability in the entertainment game. Utilizing this interface, the ESE 120 may also communicate player choices made in the game to the GWE 112, such as but not limited to selection of a different gun, and/or the player picking up a special potion in the GW environment. The GWE's job in this architecture, being interfaced thusly to the ESE 120, is to allow the transparent coupling of entertainment software to a fair and transparent random chance gambling game, providing a seamless perspective to the player that they are playing a typical popular entertainment game (which is skill based). In certain embodiments, the ESE 120 can be used to enable a wide range of entertainment games at different gameplay layers interconnected during a gameplay session with gameplay impact from player actions at one gameplay layer applied to gameplay at another gameplay layer including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In several embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of games per minute the RWE 102 can execute, entrance into a bonus round, and other factors, all the while these factors can take a different form than that of a typical slot machine. An example of a varying wager amount that the player can choose might be that they have decided to play with a more powerful character in the game, a more powerful gun, or a better car. These choices can increase or decrease the amount wagered per individual gambling game, in the same manner that a standard slot machine player may decide to wager more or less credits for each pull of the handle. In several embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In a particular embodiment, the RWE 102 operation can be a game of chance as a gambling game running every 10 seconds where the amount wagered is communicated from the GWE 112 as a function of choices the player makes in the operation profile in the entertainment game such as those cited above.

In many embodiments, a controlled entity hybrid game integrates a video game style gambling machine, where the gambling game (i.e. RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time a rich environment of rewards to stimulate "gamers" can be established with the entertainment game. In several embodiments, the controlled entity hybrid game can leverage very popular titles with "gamers" and provides a sea change environment for casinos to attract players with games that are more akin to the type of entertainment that a younger generation desires. In various embodiments, players can use their skill towards building and banking GWC that in turn can be used to win tournaments and various prizes as a function of their "gamer" prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In certain embodiments, controlled entity hybrid games also allow players to gain entry into subsequent competitions through the accumulation of game world credits (GWC) that accrue as a function of the user's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue.

In many embodiments, one or more players engage in playing an entertainment game, resident in the ESE, the outcomes of which are dependent at least in part on skill. The controlled entity hybrid game can include an entertainment game that includes head-to-head play between a single player and the computer, between two or more players against one another, or multiple players playing against the computer and/or each other, as well as the process by which players bet on the outcome of the entertainment game.

Network Connected Controlled Entity Hybrid Games

Controlled entity hybrid games in accordance with many embodiments of the invention can operate locally while being network connected to draw services from remote locations or to communicate with other controlled entity hybrid games. In many embodiments, operations associated with a controlled entity hybrid game such as (but not limited to) processes for calculating score or RWC and GWC tracking can be performed across multiple devices. These multiple devices can be implemented using a single server or a plurality of servers such that a controlled entity hybrid game is executed as a system in a virtualized space, such as (but not limited to) where the RWE and GWE are large scale centralized servers "in the cloud" coupled to a plurality of widely distributed ESE controllers or clients via the Internet.

In many embodiments, an RWE server can perform certain functionalities of a RWE of a controlled entity hybrid game. In certain embodiments, a RWE server includes a centralized odds engine which can generate random outcomes (such as but not limited to win/loss outcomes) for a gambling game, thereby eliminating the need to have that functionality of the RWE performed locally within the controlled entity hybrid game. The RWE server can perform a number of simultaneous or pseudo-simultaneous runs in order to generate random outcomes for a variety of odds percentages that one or more networked controlled entity hybrid games may require. In certain embodiments, an RWE of a controlled entity hybrid game can send information to a RWE server including (but not limited to) Table Ln-RWC tables, maximum speed of play for a gambling game, gambling game monetary denominations or any promotional RWC provided by the operator of the controlled entity hybrid game. In particular embodiments, a RWE server can send information to a RWE of a controlled entity hybrid game including (but not limited to) RWC used in the gambling game, player profile information or play activity and a profile associated with a player.

In several embodiments, a GWE server can perform the functionality of the GWE across various controlled entity hybrid games. These functionalities can include (but are not limited to) providing a method for monitoring high scores on select groups of games, coordinating interactions between gameplay layers, linking groups of games in order to join them in head-to-head tournaments, and acting as a tournament manager. A multilayer module can execute as part of a GWE server to coordinate the gameplay impact from player actions applied to player and/or player classes at various gameplay layers within a controlled entity hybrid game.

In a variety of embodiments, management of player profile information can be performed by a GWE patron management server separate from a GWE server. A GWE patron management server can manage information related to a player profile, including (but not limited to) data concerning players' characters, players' game scores, players' RWC and GWC and managing tournament reservations. Although a GWE patron management server is discussed separate from a GWE server, in certain embodiments a GWE server also performs the functions of a GWE patron management server. In certain embodiments, a GWE of a controlled entity hybrid game can send information to a GW patron management server including (but not limited to) GWC and RWC used in a game, player profile information, play activity and profile information for players and synchronization information between a gambling game and an entertainment game or other aspects of a controlled entity hybrid game. In particular embodiments, a GW patron management server can send information to a GWE of a controlled entity hybrid game including (but not limited to) entertainment game title and type, tournament information, Table Ln-GWC tables, special offers, character or profile setup and synchronization information between a gambling game and an entertainment game or other aspects of a controlled entity hybrid game. A multilayer module can execute as part of a GWE patron management server to coordinate the gameplay impact from player actions applied to players and/or player classes at various gameplay layers within a controlled entity hybrid game.

In numerous embodiments, an ESE server provides a host for managing head-to-head play, operating on the network of ESEs which are connected to the ESE server by providing an environment where players can compete directly with one another and interact with other players. Although an ESE server is discussed separate from a GWE server, in certain embodiments a GWE server also performs the functions of an ESE server.

In several embodiments, a multilayer server can be connected with a controlled entity hybrid game and can implement a multilayer module to coordinate the activities of a controlled entity hybrid game. A multilayer module can execute as part of a multilayer server to coordinate the gameplay impact from player actions applied to players and/or player classes at various gameplay layers within a controlled entity hybrid game. In numerous embodiments, a multilayer server can be part of a distributed system where processes of a multilayer server occur across different multilayer servers of a multilayer server system.

Servers connected via a network to implement controlled entity hybrid games in accordance with many embodiments of the invention can communicate with each other to provide services utilized within a controlled entity hybrid game. In several embodiments a RWE server can communicate with a GWE server. A RWE server can communicate with a GWE server to communicate any type of information as appropriate for a specific application, including (but not limited to): configure the various simultaneous or pseudo simultaneous odds engines executing in parallel within the RWE to accomplish the controlled entity hybrid game system requirements, determine metrics of RWE performance such as random executions run and outcomes for tracking system performance, perform audits, provide operator reports, and request the results of a random run win/loss result for use of function operating within the GWE (such as where automatic drawings for prizes are a function of ESE performance).

In several embodiments a GWE server can communicate with an ESE server. A GWE server can communicate with an ESE server to communicate any type of information as appropriate for a specific application, including (but not limited to): the management of an ESE server by a GWE server such as the management of a controlled entity hybrid game tournament. Typically a GWE (such as a GWE that runs within a controlled entity hybrid game or on a GWE server) is not aware of the relationship of itself to the rest of a tournament since in a typical configuration the actual tournament play is managed by the ESE server. Therefore, management of a controlled entity hybrid game tournament can include (but is not limited to) tasks such as: conducting tournaments according to system programming that can be coordinated by an operator of the controlled entity hybrid game; allowing entry of a particular player into a tournament; communicating the number of players in a tournament and the status of the tournament (such as but not limited to the amount of surviving players, their status within the game, time remaining on the tournament); communicating the status of an ESE contained in a game; communicating the performance of its players within the tournament; communicating the scores of the various members in the tournament; and providing a synchronizing link to connect the GWEs in a tournament, with their respective ESE's.

In several embodiments a GWE server can communicate with a GW patron server. A GWE server can communicate with a GW patron server to communicate any type of information as appropriate for a specific application, including (but not limited to) information for configuring tournaments according to system programming conducted by an operator of a controlled entity hybrid game, exchange of data necessary to link a player's player profile to their ability to participate in various forms of sponsored gameplay (such as but not limited to the difficulty of play set by the GWE server or the GWE in the game they are playing on), determining a player's ability to participate in a tournament as a function of a player's characteristics (such as but not limited to a player's gaming prowess or other metrics used for tournament screening), configuring the game contained GWE and ESE performance to suit preferences of a player on a particular controlled entity hybrid game, as recorded in their player profile, determining a player's play and gambling performance for the purposes of marketing intelligence, and logging secondary drawing awards, tournament prizes, RWC and GWC into the player profile.

In many embodiments, the actual location of where various algorithms and functions are executed may be located either in the game contained devices (RWE, GWE, ESE), on the servers (RWE server, GWE server, or ESE server), or a combination of both. In particular embodiments, certain functions of a RWE server, GWE server, GW patron server or ESE server may operate on the local RWE, GWE or ESE contained with a controlled entity hybrid game locally. In certain embodiments, a server is a server system including a plurality of servers, where software may be run on one or more physical devices. Similarly, in particular embodiments, multiple servers may be combined on a single physical device.

Figure 2:
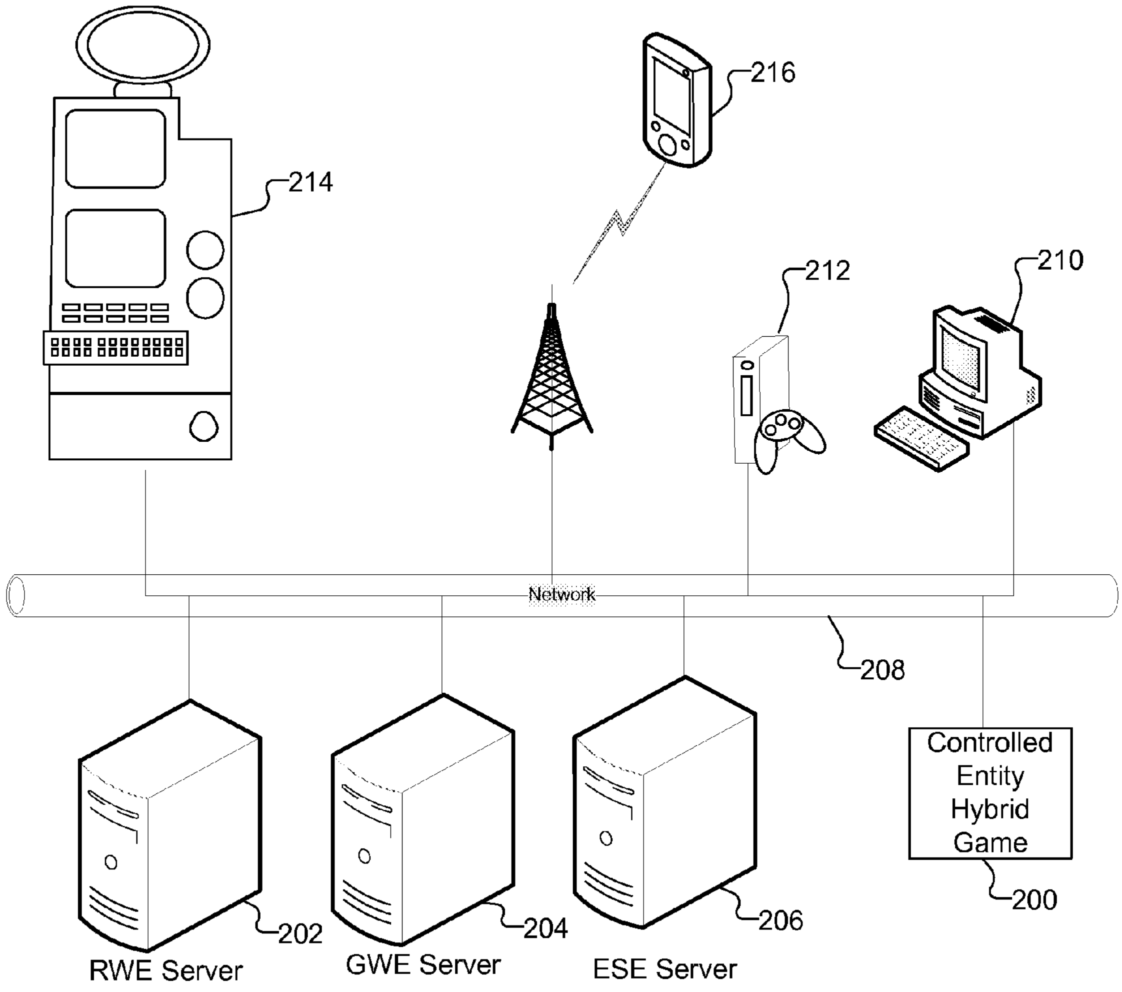
FIG. 2 is a system diagram that illustrates a network distributed controlled entity hybrid game in accordance with an embodiment of the invention.

Various components of controlled entity hybrid games in accordance with many embodiments of the invention can be networked with remote servers in various configurations. A networked controlled entity hybrid game in accordance with an embodiment of the invention is illustrated in FIG. 2. The networked controlled entity hybrid game 200 is connected with an RWE server 202, a GWE server 204, and an ESE server 206 over a network 208, such as (but not limited to) the Internet. Servers networked with a networked controlled entity hybrid game 200 can also communicate with each of the components of a networked controlled entity hybrid game and amongst the other servers in communication with the networked controlled entity hybrid game 200.

In various embodiments, controlled entity hybrid games may be implemented, in whole or in part, on a variety of devices, including, but not limited to, a personal computer 210, a gaming console 212, a casino game housed in a cabinet 214, or a mobile device 216 such as a tablet computer or smartphone.

Although various networked controlled entity hybrid games are discussed above, networked controlled entity hybrid games can be configured in any manner as appropriate to the requirements of a specific application in accordance with embodiments of the invention.

Among factors in the functioning of a controlled entity hybrid game are one or more enabling elements (EE), one or more actionable elements (AE), one or more controlled entities (CE) and their interoperability with the game.

EEs for a controlled entity hybrid game include types of consumable commodities and/or accumulating elements in a game context utilized to play and operate characters or take actions in a game space. Types of EE include (but are not limited to): weapons ammunition, health points in a fighting game, potions in the case of a fantasy game, fuel in the case of a driving game, time in the case of a game where one races against the clock to achieve some objective, armies in the case of a military strategy game, or downs in the case of football. The nature of EE is a function of the type of entertainment game executed on the ESE and its structure. In some embodiments, the consumption of EE in the process of playing the ESE entertainment game would trigger gambling plays on the RWE portion of the controlled entity hybrid game. In various embodiments, it is also possible that the events of or acts of accumulation of EE in the entertainment game might also trigger RWE gambling plays in the same manner that consumption of EE would. Additionally, in some embodiments, it is possible that EE is recycled. The recycling or reuse of EE might also trigger RWE gambling plays. This is to say that games could use either EE consumption, EE accumulation, EE recycling or a combination of events to trigger RWE wagers. The correlation of what events resulting in the accumulation or consumption of EE might trigger RWE plays, and when, and the amount of RC wagered as a result of these events, would be a function of algorithms and formulae operating within the GWE and the controlled entity hybrid game. It should be understood that as consistent with controlled entity hybrid game methods that other triggers for RWE plays other than EE consumption or accumulation could be possible.

Like EE, an AE can initiate a gambling game by committing RC to the gambling proposition within the RWE. Like an EE, AE may be consumed, recycled or accumulated. AEs, are tied to specific player decisions or player directed actions that are undertaken in the context of the entertainment game, the outcome of those decisions or actions, or a game event or milestone points, or the transpiring of real or virtual game time in the process of playing the entertainment game. AEs, are constructs within the GW affected by player world decisions or actions subject to various formulae and algorithms as to whether the player world action or decision causes the AE to transpire.

A controlled entity (CE) includes, but is not limited to, a player's game world character, an entity, an inanimate object, a device or other object under control of the player.

Figure 3:
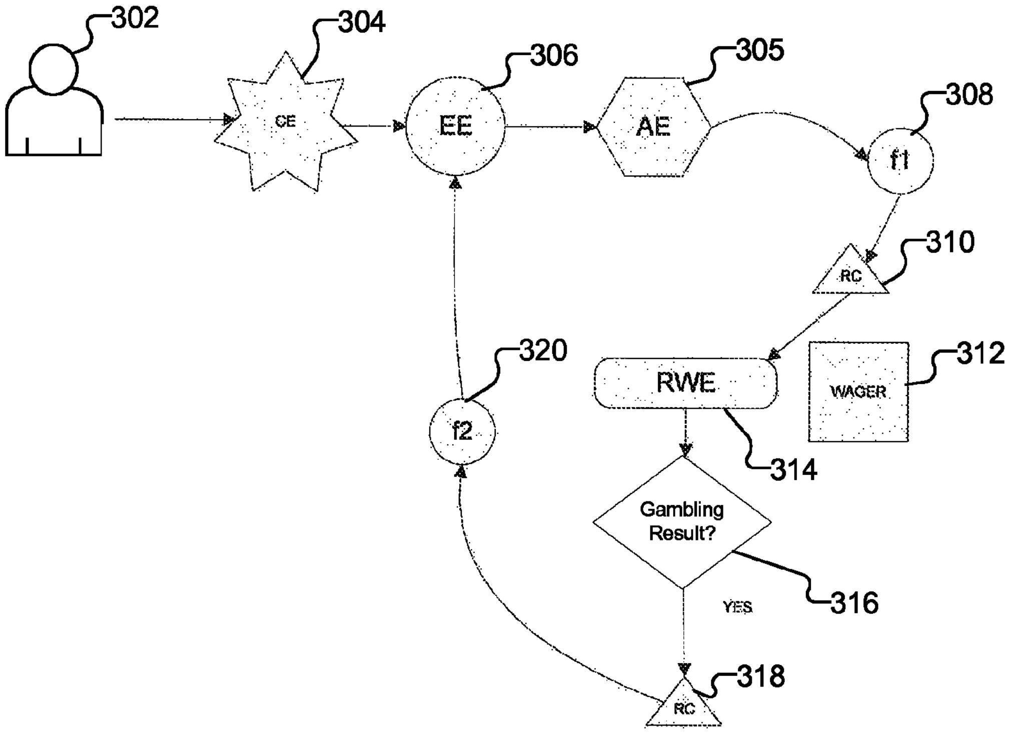
FIG. 3 is a flow chart illustrating use of a controlled entity in accordance with an embodiment of the invention.

FIG. 3 is a flow chart illustrating use of a controlled entity in accordance with an embodiment of the invention. In FIG. 3, a player 302 instructs a controlled entity 304 as part of gameplay of a controlled entity hybrid game. The controlled entity 304 consumes an entertainment game element, such as EE 306. This in turn causes an AE 305 to take place, which in turn triggers a wager 312 in an RWE 314. The gambling game result 316 then creates as output a change in the amount of RC 318 and a change in the amount of the EE 306. The amount of RC 310 committed to the wager is a function (f1) 308 of the AE 305 in this case, and the result of the wager, if positive, generates RC 318. The gambling result also, by function f2 320, facilitates a further change in EE 306. In various embodiments, an amount of EE may be incremented on a positive gambling result, or an amount of EE may be decremented on a positive gambling result, or an amount of EE may be incremented on a negative gambling result, or an amount EE may be decremented on a negative gambling result. In still further embodiments, a character, attribute or type of EE may be changed.

In a particular embodiment, a controlled entity hybrid game implements a racing game. In such a game, gasoline is treated as an EE and is consumed as a car, which is an example of a CE is driven around a track by a player. Upon passing a starting line (i.e. completing one lap), an AE occurs (i.e. the negotiation of one lap), which causes an amount of RC to be committed to a gambling game as a function of f1 (a relationship between AE and RC). If the gambling game has a positive outcome and returns RC, the CE (in this case the car) also realizes an increase in gasoline (EE) as a function of function f2. The player instructs the CE in this embodiment by turning a steering wheel, and depressing brake and accelerator pedals.

Figure 4:
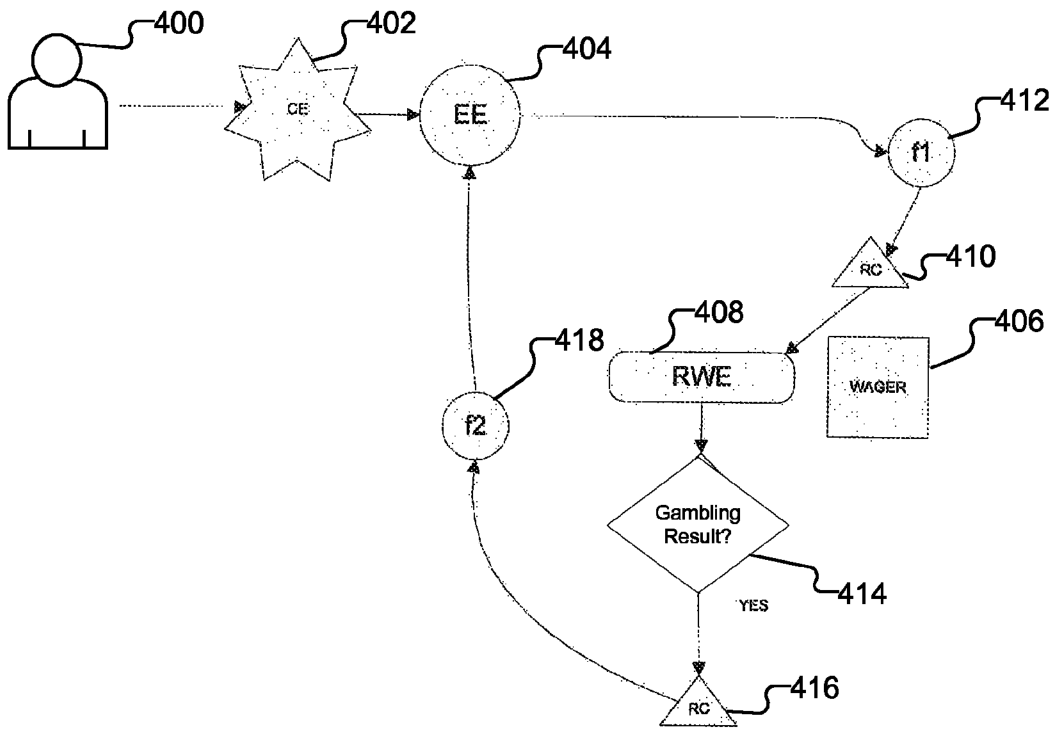
FIG. 4 is a flow chart illustrating another use of a controlled entity in accordance with an embodiment of the invention.

FIG. 4 is a flow chart illustrating another use of a controlled entity in accordance with an embodiment of the invention. In FIG. 4, a player 400 instructs a controlled entity 402 and the controlled entity consumes an EE 404, which in turn triggers a wager 406 in the RWE 408. A gambling game result 414 of the wager then creates as output a change in an amount of RC 416 and a change in an amount of EE 44. The amount of RC 410 committed to the wager is a function (f1) 412 of EE 404 in this case, and the result 414 of the wager 406, if positive, generates RC 416. The gambling result also, by function (f2) 418, facilitates a further change in EE 44. In various embodiments, an amount of EE may be incremented on a positive gambling result, or an amount of EE may be decremented on a positive gambling result, or an amount of EE may be incremented on a negative gambling result, or an amount EE may be decremented.

In a specific embodiment, a racing game is implemented using a controlled entity hybrid game. Gasoline (EE) is consumed as the car (Controlled Entity—CE) is driven around the track. Upon consumption of a discrete amount of EE, an amount of RC to be committed to the game as a function of f1 (a relationship between EE and RC). If the gambling game has a positive outcome and returns RC, the controlled entity (in this case the car) also realizes an increase in gasoline (EE) as a function of function f2. The player instructs the CE in this example by turning a steering wheel, and depressing brake and accelerator pedals.

Figure 5:
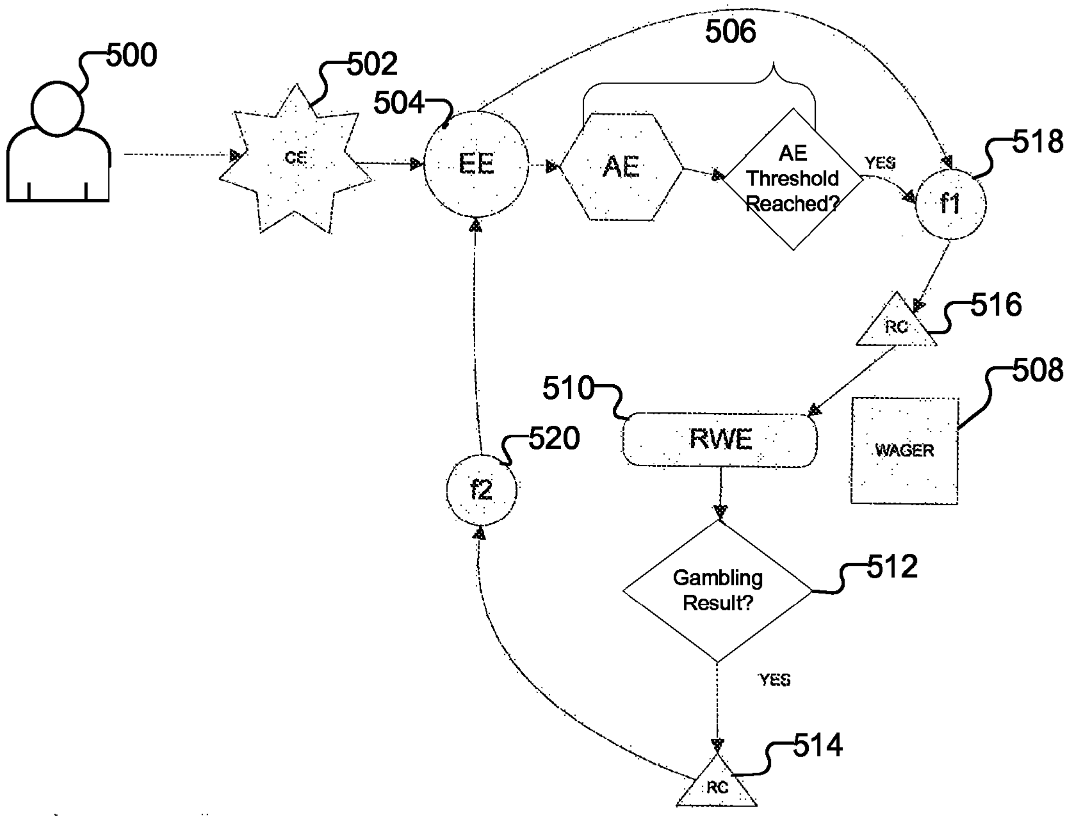
FIG. 5 is a flow chart illustrating another use of a controlled entity in accordance with an embodiment of the invention.

FIG. 5 is a flow chart illustrating another use of a controlled entity in accordance with an embodiment of the invention. In FIG. 5, a player 500 instructs a controlled entity 502 which in turn consumes an EE 504. This in turn causes an AE 506 to take place, which in turn triggers a wager 508 in an RWE 510. A gambling game result 512 then creates as output a change 514 in the amount of RC and a change in the amount of EE 504. An amount of RC 516 committed to the wager is a function (f1) 518 of EE 504 and not AE 506 in this case, and the result of the wager, if positive, generates RC. The gambling result also, by function f2 520, facilitates a further change in EE 504. In various embodiments, an amount of EE may be incremented on a positive gambling result, or an amount of EE may be decremented on a positive gambling result, or an amount of EE may be incremented on a negative gambling result, or an amount EE may be decremented.

In one embodiment, a racing game is implemented using a controlled entity hybrid game. Gasoline (EE) is consumed as the car (Controlled Entity—CE) is driven around the track. Upon driving 1 km an AE occurs, which causes an amount of RC to be committed to the game as a function of f1 (a relationship between EE and RC). If the gambling game has a positive outcome and returns RC, the controlled entity (in this case the car) also realizes an increase in gasoline (EE) as a function of function f2. The player instructs the CE in this example by turning a steering wheel, and depressing brake and accelerator pedals. What is interesting about this implementation is that the amount that one has to commit to the gambling game can be a function of skill (i.e. if one consumes more gas to drive 1 kM one may have to commit more or less RC to the gambling game as a function of 'f1').

Figure 6:
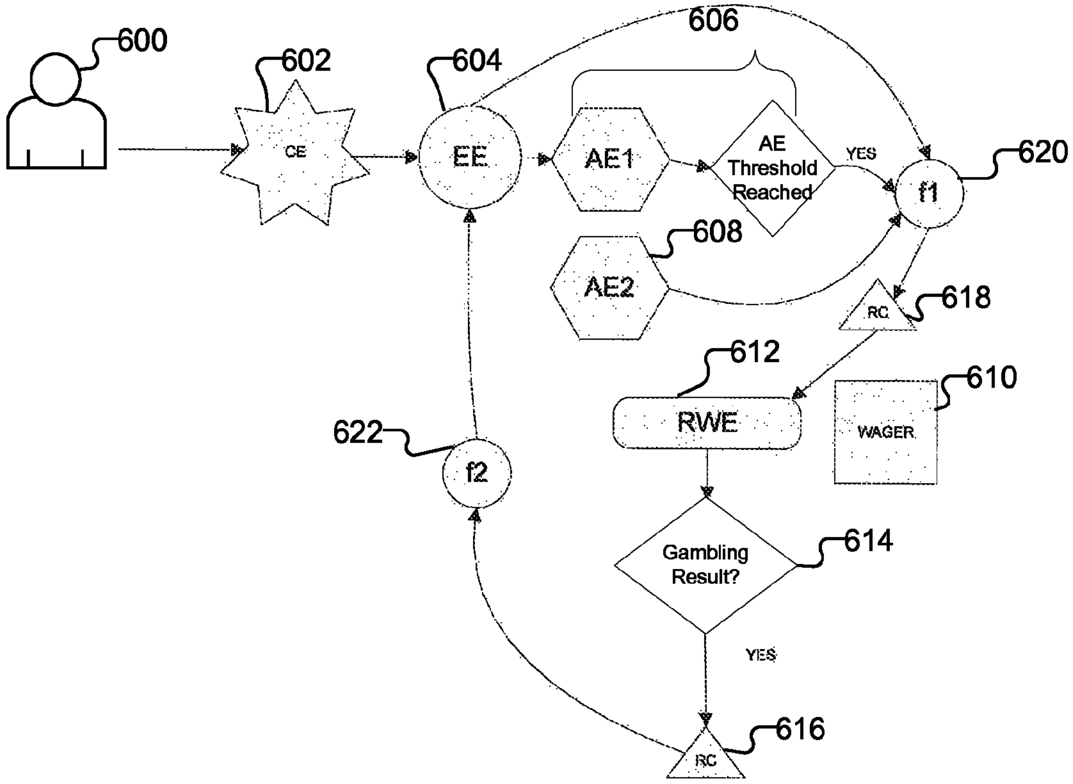
FIG. 6 is a flow chart illustrating another use of a controlled entity in accordance with an embodiment of the invention.

FIG. 6 is a flow chart illustrating another use of a controlled entity in accordance with an embodiment of the invention. In FIG. 6 a player 600 instructs a controlled entity 602 which in turn consumes an EE 604. This in turn causes one or more AEs, such as AE1 606 and AE2 608, to take place, which in turn triggers a wager 610 in the RWE 612. The gambling game result 614 then creates as output a change in the amount of RC 616 and a change in the amount of EE 604. The amount of RC 618 committed to the wager is a function (f1) 620 of EE 604 and AE2 608, and the result of the wager, if positive, generates RC 616. The gambling result also, by function f2 622, facilitates a further change in EE 604. There may be one or more (n) AEs, such as AE2 608 affecting the amount of RC 618 committed to the wager, where n is greater or equal to 1. In various embodiments, an amount of EE may be incremented on a positive gambling result, or an amount of EE may be decremented on a positive gambling result, or an amount of EE may be incremented on a negative gambling result, or an amount EE may be decremented.

In one embodiment, a racing game is implemented using a controlled entity hybrid game. Gasoline (EE) is consumed as the car (Controlled Entity—CE) is driven around the track. Upon driving 1 km an AE1 occurs, which causes an amount of RC to be committed to the game as a function of f1 (a relationship between EE, AE2 and RC). In this embodiment, AE2 is the number of competitor cars (either computer controlled or operated by competitive players via their CEs) that are passed while achieving AE1. If the gambling game has a positive outcome and returns RC, the controlled entity (in this case the car) also realizes an increase in gasoline (EE) as a function of function f2. The player instructs the CE in this example by turning a steering wheel, and depressing brake and accelerator pedals. What is interesting about this implementation is that the amount that one has to commit to the gambling game can be a function of skill (i.e. if one consumes more gas to drive 1 kM one may have to commit more or less RC to the gambling game as a function of 'f1').

Figure 7:
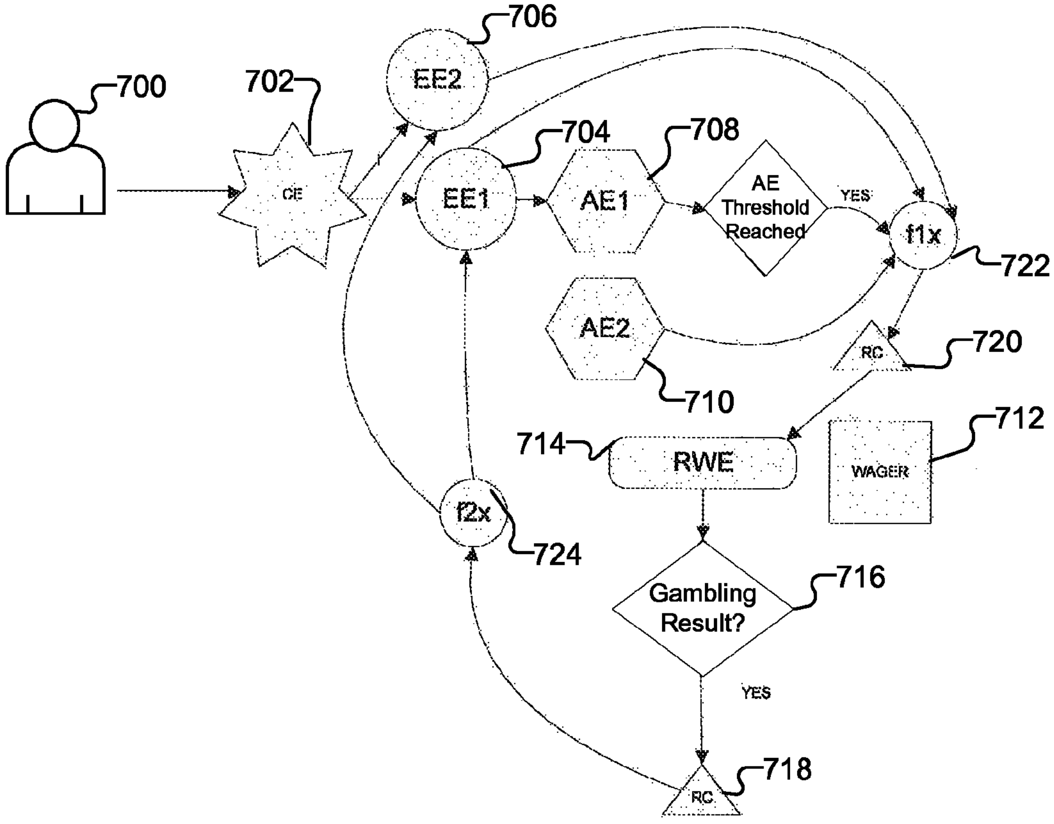
FIG. 7 is a flow chart illustrating another use of a controlled entity in accordance with an embodiment of the invention.

FIG. 7 is a flow chart illustrating another use of a controlled entity in accordance with an embodiment of the invention. In FIG. 7, a player 700 instructs a controlled entity 702 which in consumes one or a multitude of EE, such as EE1 704 and EE2 706. This in turn causes one or more AE to take place, such as AE1 708 and AE2 710, which in turn triggers a wager 712 in an RWE 714. A gambling game result 716 then creates as output a change in the amount of RC 718 and a change in the amount of one or more EE, such as EE1 704 and EE2 706. The amount of RC committed 720 to the wager is governed by functions (f1x) 722 taking as arguments one or a multitude each of EE and AE, such as EE2, EE2, AE1 and AE2, and the result of the wager, if positive, generates RC. The gambling result also, by a set of functions f2x 724, facilitates a further change in one or a multitude of EE, such as EE1 and EE2. There may be n AE (and m EE) affecting the amount of RC committed to the wager, where one of (m and n) is greater than zero and the other of (m and n) is zero or greater than zero. In various embodiments, an amount of EE may be incremented on a positive gambling result, or an amount of EE may be decremented on a positive gambling result, or an amount of EE may be incremented on a negative gambling result, or an amount EE may be decremented.

In one embodiment, a racing game is implemented using a controlled entity hybrid game. An example would be a racing game. Gasoline (EE1) and driver stamina (EE2) is consumed as the car (Controlled Entity—CE) is driven around the track. Upon driving 1 km an AE1 occurs, which causes an amount of RC to be committed to the game as a function of f1x (a set of relationships between EE1, EE2, AE2 and RC). In this example, AE2 is the number of competitor cars (either computer controlled or operated by competitive players via their CEs) that are passed while achieving AE1. If the gambling game has a positive outcome and returns RC, the controlled entity (in this case the car) also realizes an increase in gasoline (EE1) and/or EE2 (driver stamina) as a function of function f2x. The player instructs the CE in this example by turning a steering wheel, and depressing brake and accelerator pedals. What is interesting about this implementation is that the amount that one has to commit to the gambling game can be a function of skill (i.e. if one consumes more gas to drive 1 kM one may have to commit more or less RC to the gambling game as a function of 'f1 x').

Figure 8:
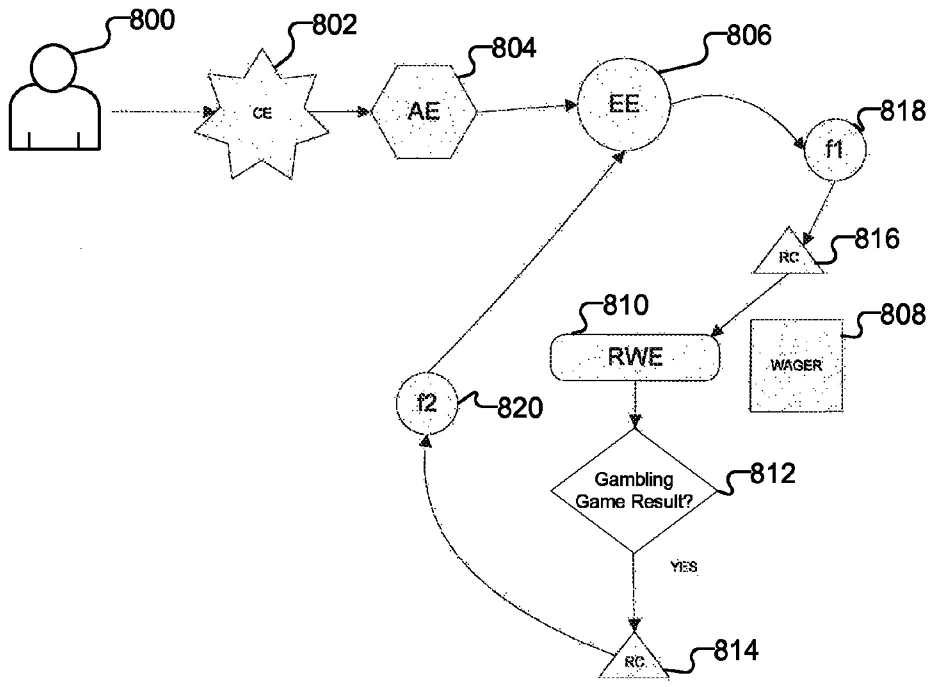
FIG. 8 is a flow chart illustrating another use of a controlled entity in accordance with an embodiment of the invention.

FIG. 8 is a flow chart illustrating another use of a controlled entity in accordance with an embodiment of the invention. In FIG. 8, a player 800 instructs controlled entity 802 which in turn undertakes an actionable element (AE) 804. This in turn causes EE 806 to be consumed, which in turn triggers a wager 808 in the RWE 810. A gambling game result 812 then creates as output a change in the amount of RC 814 and a change in the amount of EE 806. The amount of RC 816 committed to the wager is a function (f1) 818 of EE 806, and the result of the wager, if positive, generates RC. The gambling result also, by function f2 820, facilitates a further change in EE 806. In various embodiments, an amount of EE may be incremented on a positive gambling result, or an amount of EE may be decremented on a positive gambling result, or an amount of EE may be incremented on a negative gambling result, or an amount EE may be decremented.

In one embodiment, an adventure game is implemented in a controlled entity hybrid game. The controlled entity in this case is an adventurer. The adventurer opens a safe (the AE) and in so doing consumes a certain amount of health points (the EE). An amount of RC is committed to the gambling game as a function of the amount of EE consumed. The gambling game returns a specific amount of RC, which if greater than zero generates a change in the adventurer's health points (EE) via function f2. It should be understood that each of the aforementioned elements of certain embodiments (i.e. multiple EE, AE, their combination affecting wagering, the need to undertake a specific AE to launch a wager, etc.) can likewise be applied to the above construct, where the causality between AE and EE has been inverted.

Figure 9:
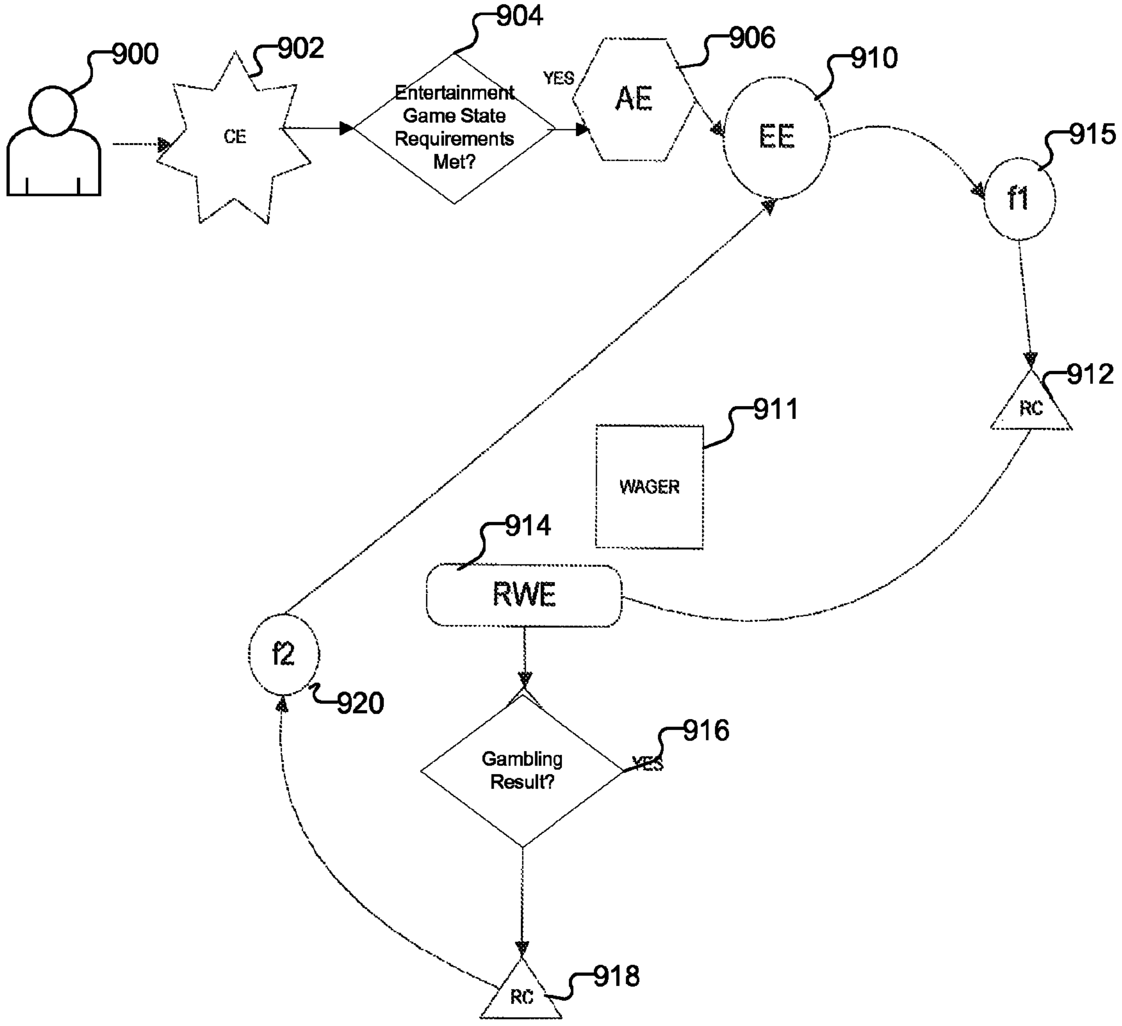
FIG. 9 is a flow chart illustrating another use of a controlled entity in accordance with an embodiment of the invention.

FIG. 9 is a flow chart illustrating another use of a controlled entity in accordance with an embodiment of the invention. In FIG. 9, the diamond 904 represents an area of interest within an entertainment game. Specifically, before a CE can undertake an action certain entertainment game state requirements may be required to be met. This can include, but is not limited to, characteristics or attributes of the CE, possessions of the CE, the state of game play generally, the value of various game objects, etc. In a particular embodiment, in an adventure game, a CE is directed to open a door, as indicated by AE 906. This would in turn cause the consumption of a certain amount of health points (EE) 910, which would in turn trigger the commitment as a wager 911 of RC 912 to a gambling game within an RWE 914. The amount of RC committed is determined by a function f1 915. Upon determination of a gambling result 916, an amount of RC 918 is incremented or decremented. The resultant change in RC results in a change in EE 910 via function f2 920. However, in such an embodiment, it is not possible for the CE to undertake this AE (opening the door) without possession of a specific key (i.e. a game object) or if there is inadequate ambient lighting (i.e. a game state), or if the CE's health points are too low (i.e. the characteristic of the CE).

Figure 10:
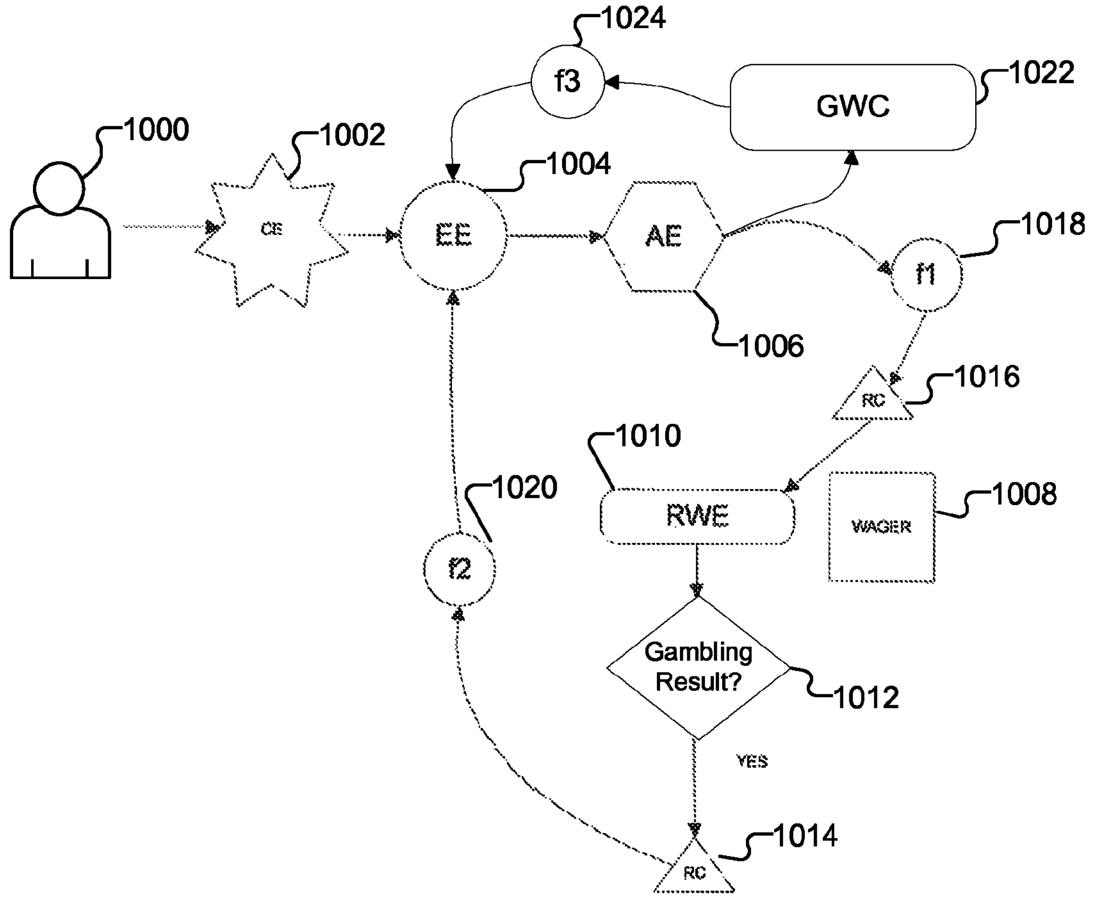
FIG. 10 is a flow chart illustrating another use of a controlled entity in accordance with an embodiment of the invention.

FIG. 10 is a flow chart illustrating another use of a controlled entity in accordance with an embodiment of the invention. In FIG. 10, a player 1000 instructs a controlled entity 1002 as part of gameplay of a controlled entity hybrid game.

The controlled entity 1002 consumes an entertainment game element, such as EE 1004. This in turn causes an AE 1006 to take place, which in turn triggers a wager 1008 in an RWE 1010. The gambling game result 1012 then creates as output a change in the amount of RC 1014 and a change in the amount of the EE 1004. The amount of RC 1016 committed to the wager is a function (f1) 1018 of the AE 1006 in this case, and the result of the wager, if positive, generates RC 1014. The gambling result also, by function f2 1020, facilitates a further change in EE 1004. In various embodiments, an amount of EE may be incremented on a positive gambling result, or an amount of EE may be decremented on a positive gambling result, or an amount of EE may be incremented on a negative gambling result, or an amount EE may be decremented. In still further embodiments, the nature, character, type or attributes of an EE may be changed. Entertainment game play causes game world credit (GWC) 1022 to be accumulated when certain events take place, achievements won, enemies vanquished, laps driven, etc., all examples of AE. In some embodiments, a feedback loop between GWC 1022 and EE 1004 exists such that the amount of EE related to the consumption of the CE 1002 is altered as a function of f3 1024, where f3 takes as an (and in some cases its only) argument the amount of GWC or the change in GWC or a GW result.

In one embodiment, a racing game is implemented using a controlled entity hybrid game, where the car is CE, gasoline is EE, and each km driven is an AE. Gambling game wagers, and the commitment of RC are initiated for each AE (km driven). The result of the wager drives a change in RC, and through f2 may alter the amount of EE available to the car (CE). The skill demonstrated by the player through control of his/her CE over that period drives a change in GWC (e.g. driving a km under a certain time generates more GWC, crashing less adds to GWC, etc.), which in turn, via f3, causes additional EE (i.e. gas) to be accumulated, independent of the gambling game result.

Figure 11:
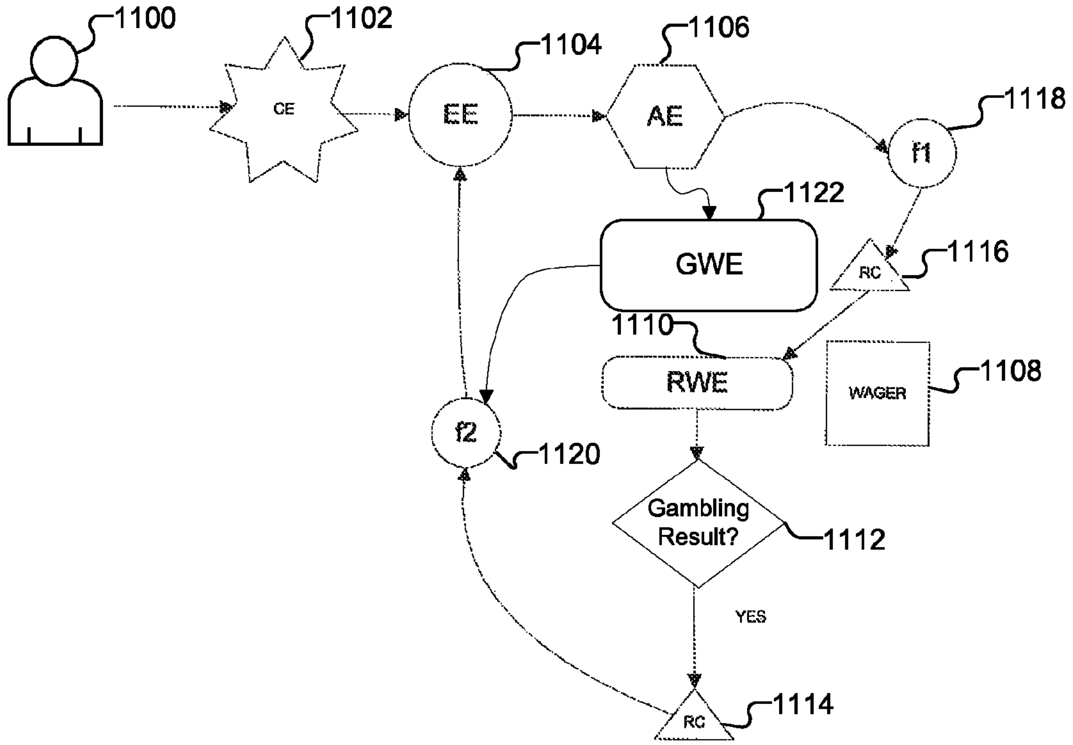
FIG. 11 is a flow chart illustrating another use of a controlled entity in accordance with an embodiment of the invention.
Figure 12:
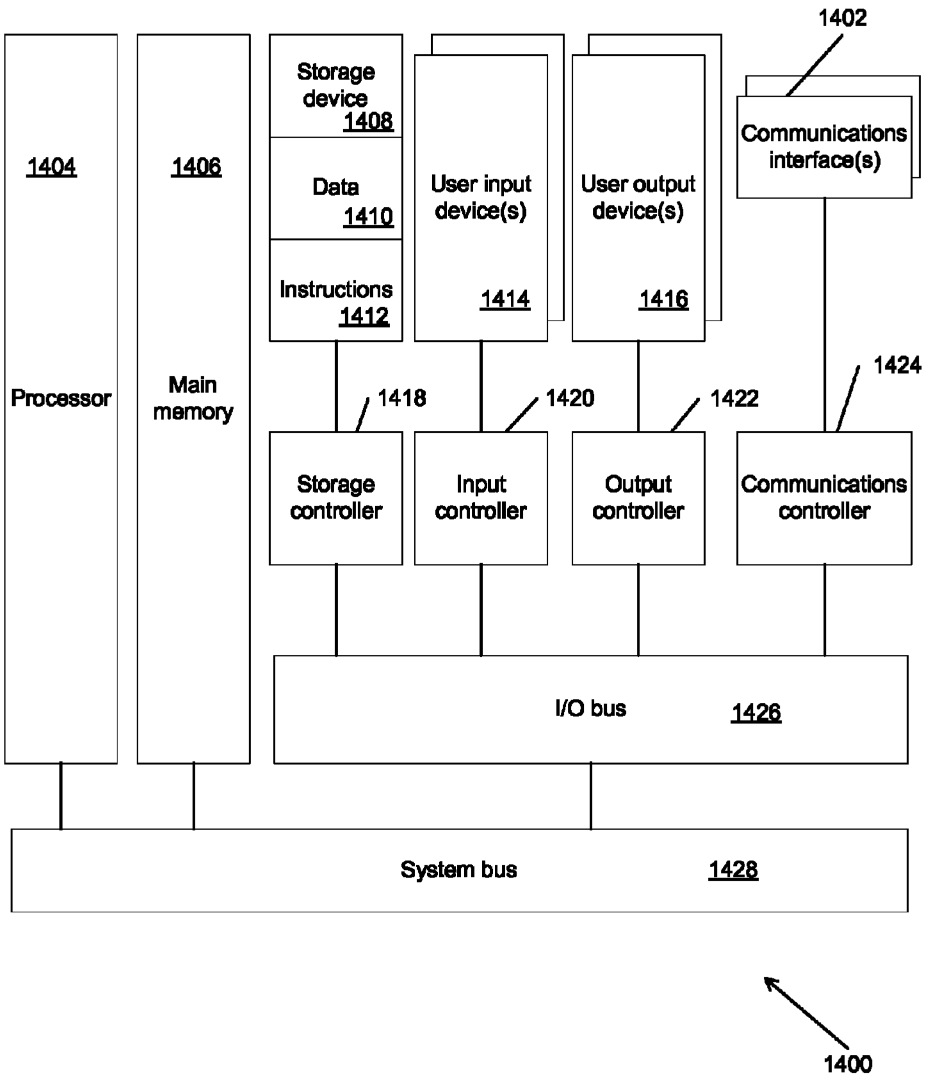
FIG. 12 illustrates a hardware architecture diagram of a processing apparatus utilized in the implementation of a controlled entity hybrid game in accordance with an embodiment of the invention.

FIG. 11 is a flow chart illustrating another use of a controlled entity in accordance with an embodiment of the invention. In FIG. 11, a player 1100 instructs a controlled entity 1102 as part of gameplay of a controlled entity hybrid game. The controlled entity 1102 consumes an entertainment game element, such as EE 1104. This in turn causes an AE 1106 to take place, which in turn triggers a wager 1108 in an RWE 1110. The gambling game result 1112 then creates as output a change in the amount of RC 1114 and a change in the amount of the EE 1104. The amount of RC 1116 committed to the wager is a function (f1) 1118 of the AE 1106 in this case, and the result of the wager, if positive, generates RC 1114. The gambling result, by function f2 1120, also facilitates a further change in EE 1104. In various embodiments, an amount of EE may be incremented on a positive gambling result, or an amount of EE may be decremented on a positive gambling result, or an amount of EE may be incremented on a negative gambling result, or an amount EE may be decremented. A function, f2 1120, may also alter the amount of EE 1104 as a function both of the output of the gambling game, and also the amount of GWC 1122, the change in GWC, or a GW result or a multitude of these factors.

Processing Apparatus

Any of a variety of processing apparatuses can host various components of a controlled entity hybrid game in accordance with embodiments of the invention. In several embodiments, these processing apparatuses can include, but are not limited to, a mobile device, a gaming machine, a general purpose computer, a computing device and/or a controller. A processing apparatus that is constructed to implement a controlled entity hybrid game in accordance with an embodiment of the invention is illustrated in FIG. 14. In the processing apparatus 1400, a processor 1404 is coupled to a memory 1406 by a bus 1428. The processor 1404 is also coupled to non-transitory processor-readable storage media, such as a storage device 1408 that stores processor-executable instructions 1412 and data 1410 through the system bus 1428 to an I/O bus 1426 through a storage controller 1418. The processor 1404 is also coupled to one or more interfaces that may be used to connect the processor to other processing apparatuses as well as networks as described herein. The processor 1404 is also coupled via the bus to user input devices 1414, such as tactile devices including but not limited to keyboards, keypads, foot pads, touch screens, and/or trackballs, as well as non-contact devices such as audio input devices, motion sensors and motion capture devices that the processing apparatus may use to receive inputs from a user when the user interacts with the processing apparatus. The processor 1404 is connected to these user input devices 1414 through the system bus 1428, to the I/O bus 1426 and through the input controller 1420. The processor 1404 is also coupled via the bus to user output devices 1416 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 1428 to the I/O bus 1426 and through the output controller 1422. The processor 1404 can also be connected to a communications interface 1402 from the system bus 1428 to the I/O bus 1426 through a communications controller 1424.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, and/or owners as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RWE, GWE or ESE as described herein can be implemented on multiple processing apparatuses, whether dedicated, shared or distributed in any combination thereof, or may be implemented on a single processing apparatus. In addition, while certain aspects and features of processes described herein have been attributed to an RWE, GWE, or ESE, these aspects and features may be implemented in a hybrid form where any of the features or aspects may be performed by any of a RWE, GWE, ESE within a controlled entity hybrid game without deviating from the spirit of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A controlled entity hybrid game, comprising:

a real world engine constructed to determine a randomly generated payout of real world credits for a wager;

an entertainment software engine constructed to execute an entertainment game providing an entertainment game outcome based upon a player's instruction of a controlled entity to consume an enabling element of the entertainment game during the player's skillful execution of the entertainment game; and a game world engine constructed to manage the entertainment software engine by:

communicating, to the real world engine, a gameplay gambling event occurrence based upon the player's instruction of the controlled entity to consume the enabling element of the entertainment game, the gameplay gambling event occurrence triggering the wager in the real world engine whereby the randomly generated payout of real world credits is determined for the wager;

determining a change in an amount of game world credit on the basis of the entertainment game outcome and the controlled entity's consumption of the enabling element; and changing an amount of the enabling element on the basis of the randomly generated payout of real world credits of the triggered wager in the real world engine and the game world credit as determined on the basis of the entertainment game outcome and the controlled entity's consumption of the enabling element.

2. The controlled entity hybrid game of claim 1, wherein the game world engine if further constructed to change an attribute of the element on the basis of the randomly generated payout.

3. The controlled entity hybrid game of claim 1, wherein consumption of the enabling element by the controlled entity causes an actionable element to trigger the wager.

4. The controlled entity hybrid game of claim 1, wherein the enabling element is not consumed unless entertainment game state requirements are met.

5. A method of operating a controlled entity hybrid game, the method comprising:

providing a real world engine that determines a randomly generated payout of real world credits for a wager;

providing an entertainment software engine that executes an entertainment game providing an entertainment game outcome based upon a player's instruction of a controlled entity to consume an enabling element of the entertainment game during the player's skillful execution of the entertainment game; and performing the following by a game world engine constructed that manages the entertainment software engine:

communicating, to the real world engine, a gameplay gambling event occurrence based upon the player's instruction of a controlled entity to consume the enabling element of the entertainment game, the gameplay gambling event occurrence triggering the wager in the real world engine whereby the randomly generated payout of real world credits is determined for the wager;

determining a change in an amount of game world credit on the basis of the entertainment game outcome and the controlled entity's consumption of the enabling element; and changing an amount of the enabling element on the basis of the randomly generated payout of real world credits of the triggered wager in the real world engine and the game world credit as determined on the basis of the entertainment game outcome and the controlled entity's consumption of the enabling element.

6. The method of operating a controlled entity hybrid game of claim 5, further comprising changing an attribute of the enabling element on the basis of the randomly generated payout of real world credits for the wager.

7. The method of operating a controlled entity hybrid game of claim 5, wherein consumption of the element by the controlled entity causes an actionable element to trigger the wager.

8. The method of operating a controlled entity hybrid game of claim 5, wherein the element is not consumed unless entertainment game state requirements are met.

9. A non-transitory machine readable medium containing processor instructions, where execution of the instructions by a processor causes the processor to perform a process comprising:

providing a real world engine that determines a randomly generated payout of real world credits for a wager;

providing an entertainment software engine that executes an entertainment game providing an entertainment game outcome based upon a player's instruction of a controlled entity to consume an enabling element of the entertainment game during the player's skillful execution of the entertainment game; and performing the following by a game world engine constructed that manages the entertainment software engine:

communicating, to the real world engine, a gameplay gambling event occurrence based upon the player's instruction of a controlled entity to consume the enabling element of the entertainment game, the gameplay gambling event occurrence triggering the wager in the real world engine whereby the randomly generated payout of real world credits is determined for the wager;

determining a change in an amount of game world credit on the basis of the entertainment game outcome and the controlled entity's consumption of the enabling element; and changing an amount of the enabling element on the basis of the randomly generated payout of real world credits of the triggered wager in the real world engine and the game world credit as determined on the basis of the entertainment game outcome and the controlled entity's consumption of the enabling element.

10. The non-transitory machine readable medium of claim 9, wherein an attribute of the enabling element is changed on the basis of the randomly generated payout of real world credits for the wager.

11. The non-transitory machine readable medium of claim 9, wherein consumption of the element by the controlled entity causes an actionable element to trigger the wager.

12. The non-transitory machine readable medium of claim 9, wherein the element is not consumed unless entertainment game state requirements are met.

* * * * *